UNITED STATES PATENT OFFICE.

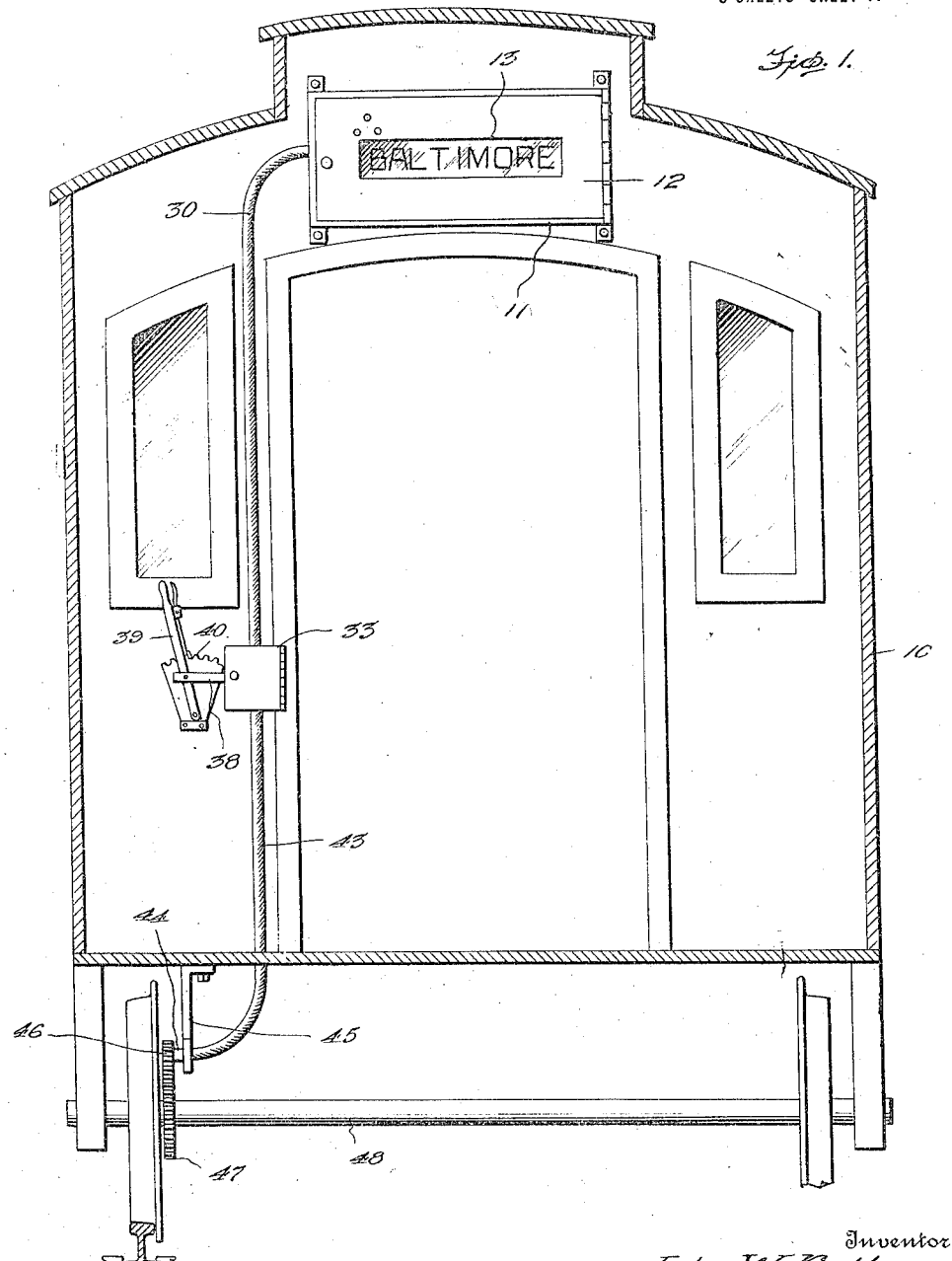

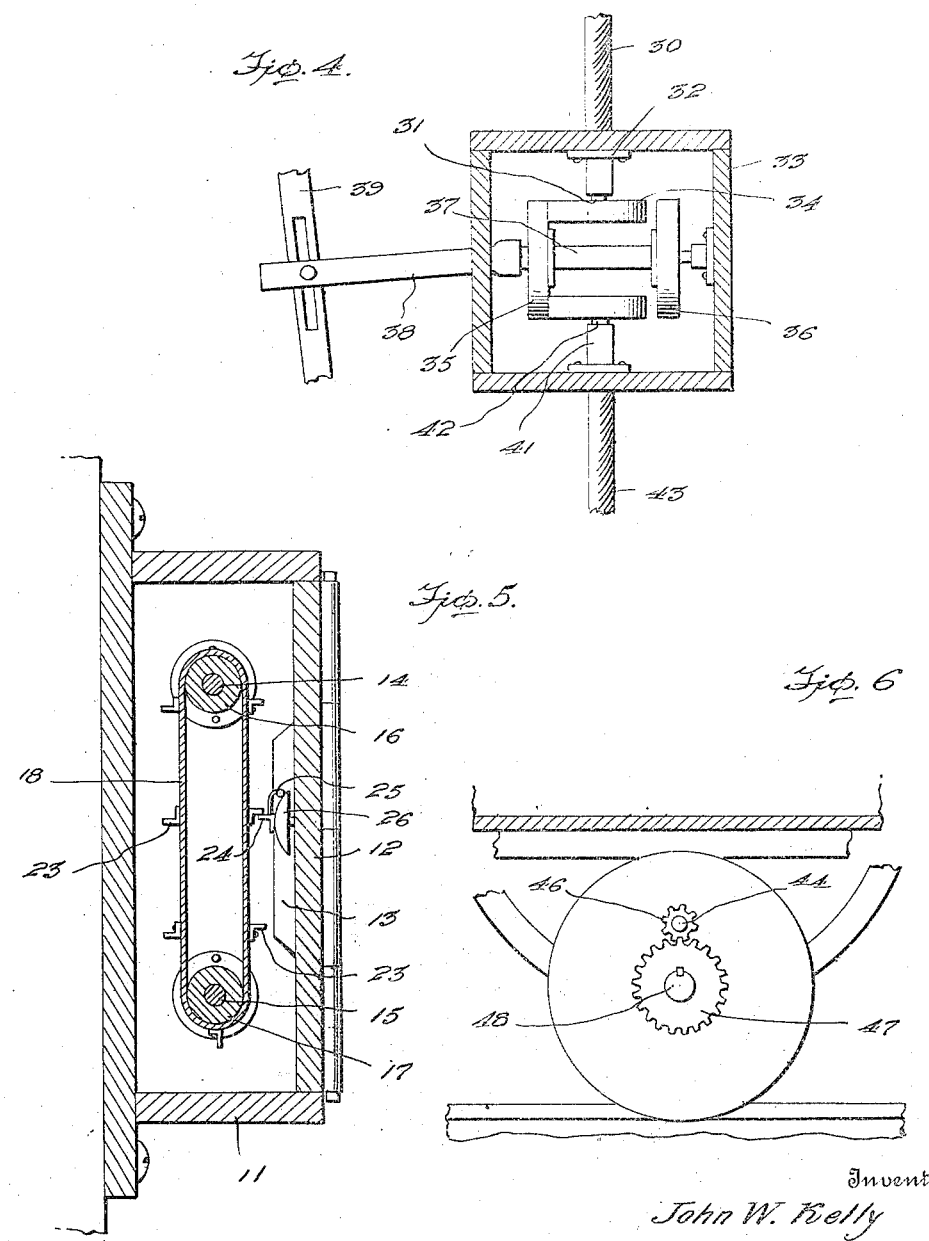

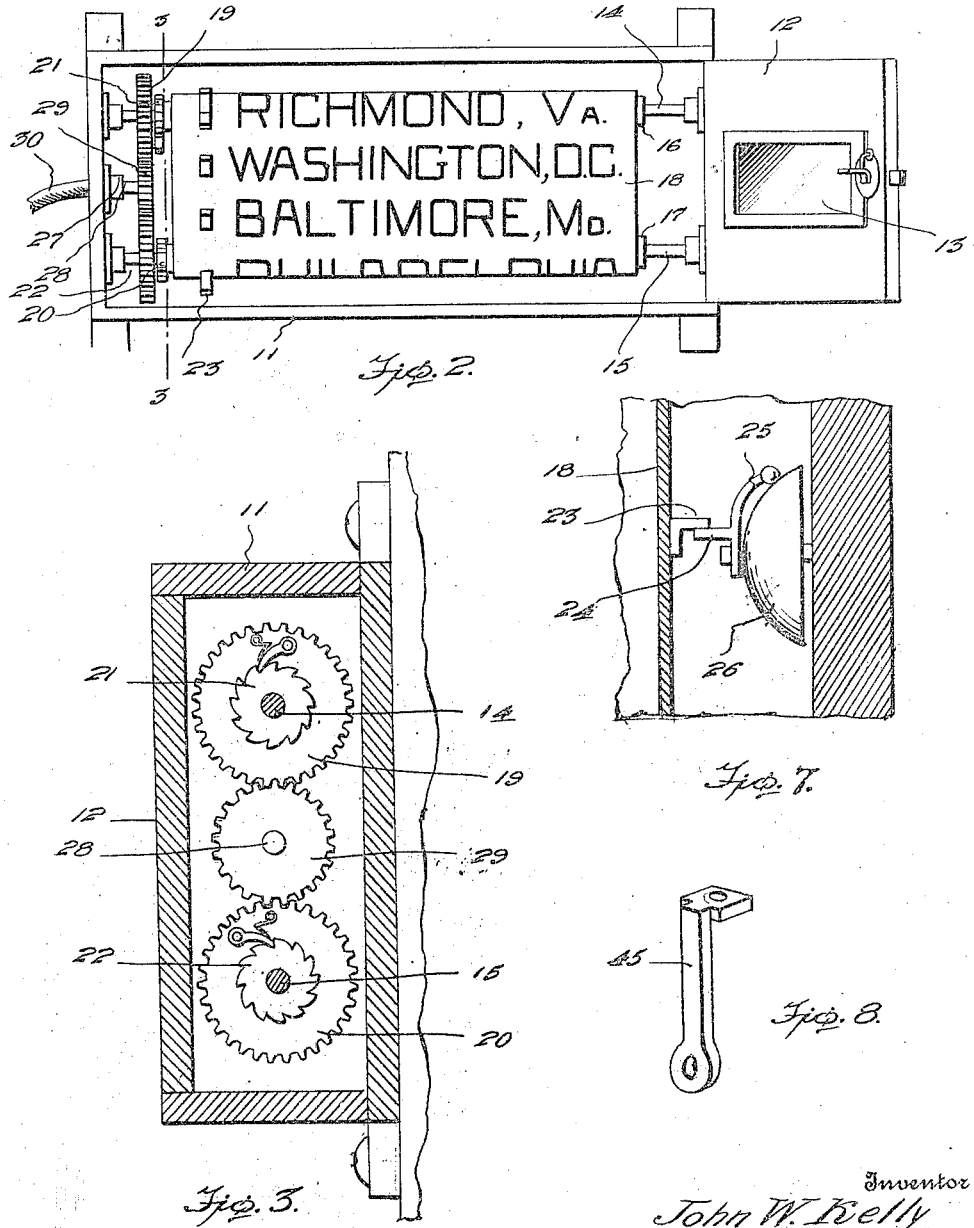

JOHN W. KELLY, OF SILVER CITY, MISSISSIPPI.

STATION-INDICATOR.

1,239,401.  Specification of Letters Patent.  Patented Sept. 4, 1917.

Application filed July 24, 1916. Serial No. 111,039.

*To all whom it may concern:*

Be it known that I, JOHN W. KELLY, a citizen of the United States, residing at Silver City, in the county of Yazoo and State of Mississippi, have invented certain useful Improvements in Station-Indicators, of which the following is a specification, reference being had therein to the accompanying drawing.

This invention relates to improvements in station indicators, one object of the invention being the provision of an indicator adapted to be mounted within the car either at the end or the center thereof and to be operably connected through a reversing clutch to an axle driven shaft, so that the indicator mechanism will be operated in accordance to the distance traveled to permit the exhibiting of a sign a predetermined distance before and after leaving a station, and so that a reverse action of the indicator may be accomplished upon the return trip.

A further object of this invention is the provision of an indicator which may be operated accurately regardless of the position of the car upon the train, as the reversing mechanism will permit the selection of the direction of travel of the indicator belt so that the stations will be exhibited in their proper sequence.

With the foregoing and other objects in view, and which will appear as the description proceeds, the present invention resides in the novel arrangement and combination of parts hereinafter set forth, and particularly claimed.

In the accompanying drawings:—

Figure 1 is a cross sectional view through a passenger coach showing the present indicator in operable relation thereto.

Fig. 2 is a front elevation of the indicator casing with the door opened to show the operating mechanism within the indicator.

Fig. 3 is a section taken on line 3—3 of Fig. 2.

Fig. 4 is a detail view of the clutch mechanism for controlling the direction of rotation of the indicator belt.

Fig. 5 is a cross section taken on line 5—5 of Fig. 2.

Fig. 6 is a detail view showing the connection of the shaft to the axle.

Fig. 7 is a detail view of the bell operating mechanism.

Fig. 8 is a perspective view of the flexible shaft supporting bracket carried by the truck.

Referring to the drawings, the numeral 10 designates a railway coach which has mounted therein at one end thereof or centrally thereof the casing 11 which as shown in Fig. 2 is provided with a hinged door 12 having the observation aperture 13.

Journaled within the casing 11 are the two shafts 14 and 15, each of which is provided with a roller 16 and 17 respectively for carrying thereon the indicator carrying belt 18.

Also mounted upon the respective shafts 14 and 15 are the pinions 19 and 20, each one of which is provided with the pawl and ratchet device 21 and 22 respectively which are oppositely disposed so that when the pinion 19 is the drive pinion, the pinion 20 will rotate freely without affecting the shaft 15, and vice versa.

Carried by the indicator belt are projections 23 disposed in the path to engage the lug 24 of the bell clapper 25 disposed in coöperation with the bell 26 mounted within the casing.

Thus the bell is actuated to call the attention of the passengers to the change of indication upon the belt 18, such indication being visible through the opening 13 of the door.

Journaled in the bearing 27 is a short rigid shaft 28 carrying upon its inner end within the casing 11 a pinion 29 which is in mesh at all times with the pinions 19 and 20.

A flexible shaft 30 is connected to the shaft 28 and is provided with the rigid shaft 31 at the lower end thereof which is journaled in the bearing 32 carried by the reversing gear casing 33.

Fast upon the lower end of the shaft 31 is a friction disk 34 which is adapted to be engaged by either one of the friction disks 35 or 36 carried upon the sliding shaft 37. This shaft 37 is controlled through the shafting link 38 and the hand lever 39 which in turn is provided with the pawl and ratchet locking device 40.

Mounted in the bearing 41 of the casing 33 is the rigid shaft 42 which is connected to the upper end of the flexible shaft 43, said flexible shaft 43 being the drive shaft and being extended downwardly and carrying the rigid shaft 44 journaled in the bracket 45. A friction disk 36' is formed upon the shaft 42 as will be seen in Fig. 4, and this disk is arranged opposite the friction disk formed on the shaft 32.

Carried upon the lower end of the shaft 44 is a pinion 46 which is in mesh at all times with the pinion 47 carried by the axle 48.

These gears and shafting are so arranged that the distance traveled by the car will control the rotation of the flexible shafts 30 and 43 so that the shafts 14 and 15 will be rotated according to the distance traveled, similar to the mileage indicating mechanism used in connection with motor cars.

From the foregoing description taken in connection with the drawings, it is evident that with an arrangement as here illustrated, railway coaches may be provided therewith and regardless of the direction of movement of the car, the flexible shaftings 30 and 43 may be controlled to present in proper sequence the station indicators carried upon the belt 18.

What I claim as new is:—

1. In a device of the class described, in combination a bearing, a horizontal shaft rotatably mounted therein, means for driving said horizontal shaft, a horizontally driven shaft above and laterally of the first named shaft, a pair of flexible shafts each being of a substantially similar shape consisting of a long straight portion and a laterally curved and deflected portion having a terminal at right angles to the long portion, the right angular terminal of one of said flexible shafts being rigidly secured to said last named driven shaft in line therewith, the right angular horizontal terminal of the other flexible shaft being diametrically opposite the similar terminal of the flexible shaft and being rigidly secured in alinement with the first named horizontal shaft, and a shaft reversing device to which the opposite ends of the longer portions of said flexible shafts are secured so that they may be disposed in alinement for rotation in the opposite directions of movement.

2. In a device of the class described, in combination a casing, a housing below and laterally of said casing, shaft bearings mounted respectively in said casing and housing at right angles to each other, a flexible shaft having a non-flexible terminal journaled in the bearing of said housing and having a non-flexible terminal at right angles to its main length journaled in the bearing of said casing and carrying a gear therein, a driven gear in said casing meshing with the other gear, a horizontal drive shaft having a gear, a bearing at right angles to said drive shaft, said drive shaft being mounted in said bearing, a second flexible shaft having a non-flexible terminal journaled in said housing opposite the other non-flexible terminal therein, said second flexible shaft also having a non-flexible terminal at right angles to its main length journaled in said last named bearing and having a gear meshing with the drive shaft gear, and means in said housing engageable with the opposing non-flexible terminals of both flexible terminal shafts for changing the rotation thereof.

In testimony whereof I affix my signature.

JOHN W. KELLY.